United States Patent
Usami et al.

(10) Patent No.: US 9,853,309 B2
(45) Date of Patent: Dec. 26, 2017

(54) METHOD OF MANUFACTURING FUEL CELL

(71) Applicant: TOYOTA JIDOSHA KABUSHIKI KAISHA, Toyota-shi, Aichi-ken (JP)

(72) Inventors: Sho Usami, Okazaki (JP); Megumi Yaegashi, Kasugai (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 53 days.

(21) Appl. No.: 14/947,663

(22) Filed: Nov. 20, 2015

(65) Prior Publication Data

US 2016/0149226 A1 May 26, 2016

(30) Foreign Application Priority Data

Nov. 26, 2014 (JP) .................. 2014-239012

(51) Int. Cl.
*H01M 4/88* (2006.01)
*H01M 8/04225* (2016.01)
*H01M 8/04302* (2016.01)
*H01M 8/1018* (2016.01)
*H01M 8/2404* (2016.01)

(52) U.S. Cl.
CPC ... *H01M 8/04225* (2016.02); *H01M 8/04302* (2016.02); *H01M 8/2404* (2016.02); *H01M 2008/1095* (2013.01); *Y02P 70/56* (2015.11)

(58) Field of Classification Search
CPC ............... H01M 4/88; H01M 8/04302; H01M 8/04225; H01M 2008/1095; H01M 8/2404; Y02P 70/56

See application file for complete search history.

(56) References Cited

U.S. PATENT DOCUMENTS

| 7,943,261 | B2 * | 5/2011 | Takebe | .............. | H01M 8/04082 |
| | | | | | 429/429 |
| 2005/0069735 | A1 * | 3/2005 | George, II | ........ | H01M 8/04223 |
| | | | | | 429/412 |

FOREIGN PATENT DOCUMENTS

| EP | 1416561 | * | 5/2004 |
| JP | 2004172106 | * | 6/2004 |
| JP | 2007273460 | * | 10/2007 |

(Continued)

OTHER PUBLICATIONS

JP2007273460 MT.*

(Continued)

*Primary Examiner* — Alex Usyatinsky
(74) *Attorney, Agent, or Firm* — Finnegan, Henderson, Farabow, Garrett & Dunner, LLP (57) ABSTRACT

A method of manufacturing a fuel cell which enables organic matter of both an anode thereof and a cathode thereof to be removed efficiently is provided. A method of manufacturing a fuel cell, comprising a preparation step of preparing a fuel cell comprising a stack of a plurality of unit cells, each including polymer electrolyte and a catalyst layer, and a removal step of removing organic matter from the fuel cell, is provided. This removal step comprises: a first step of maintaining a voltage of the fuel cell at 0 V so as to desorb organic matter from the catalyst layer; a second step of raising a temperature inside the fuel cell so as to evaporate the desorbed organic matter; and a third step of exhausting the evaporated organic matter from the fuel cell.

5 Claims, 6 Drawing Sheets

(56) References Cited

FOREIGN PATENT DOCUMENTS

JP          2009-199834          9/2009

OTHER PUBLICATIONS

JP2004172106MT.*
Decision to grant a Patent issued by JPO dated Aug. 8, 2017.*
English-language abstract of JP2007-273460A dated Oct. 18, 2007.
English-language abstract of JP2004-172106A dated Jun. 17, 2004.

* cited by examiner

METHOD OF MANUFACTURING FUEL CELL

TECHNICAL FIELD

The present invention relates to a method of manufacturing a fuel cell.

BACKGROUND ART

A solid polymer electrolyte-type fuel cell is known as a form of fuel cell. Regarding such solid polymer electrolyte-type fuel cell, the fuel cell is formed by stacking a plurality of unit cells, in each of which a membrane electrode assembly (MEA) is sandwiched by separators respectively provided with air (oxygen) gas flow paths and fuel (hydrogen) gas flow paths.

It is known that impurities, such as organic matter, adhere to an anode and a cathode of a membrane electrode assembly (MEA) during the manufacture of a fuel cell (patent document 1). Thus, patent document 1 proposes that, during the aging performed when a fuel cell is shipped (initial running-in operation for a fuel cell), a positive electrode of a power source is connected to the cathode side while a negative electrode of the power source is connected to the anode side so as to cause the potential of the cathode to be higher than that of the anode, whereby the organic matter that has adhered to the cathode is removed.

PRIOR ART REFERENCE

Patent Document

Patent Document 1: JP2009-199834 A

SUMMARY OF THE INVENTION

Problem to be Solved by the Invention

However, the above method does not allow for the removal of organic matter that has adhered to the anode. Therefore, when the fuel cell with such organic matter left is shipped, this will lead to the fuel cell's reduced output performance. Meanwhile, another removal step is required when attempting to remove organic matter that has adhered to the anode, resulting in increased complexity of the manufacturing steps.

The present invention has been made in light of the above-described background, and an object of the present invention is to provide a method of manufacturing a fuel cell which enables organic matter of both an anode thereof and a cathode thereof to be removed efficiently.

Means for Solving the Problem

In order to solve the above problem, a preferred aspect of the present invention provides a method of manufacturing a fuel cell, comprising: a preparation step of preparing a fuel cell comprising a stack of a plurality of unit cells each including polymer electrolyte and a catalyst layer; and a removal step of removing organic matter from the fuel cell, wherein the removal step comprises: a first step of maintaining a voltage of the fuel cell at 0 V so as to desorb organic matter from the catalyst layer; a second step of raising a temperature inside the fuel cell so as to evaporate the desorbed organic matter; and a third step of exhausting the evaporated organic matter from the fuel cell.

According to the above manufacturing method, the voltage of the fuel cell is maintained at 0 V, and thus, polar organic matter (for example, isobutyric acid) that has adhered to the catalyst layers of both of an anode and a cathode of the fuel cell are desorbed from such catalyst layers. Then, such desorbed organic matter is evaporated due to an increased temperature inside the fuel cell. Next, such evaporated organic matter is exhausted from the fuel cell. With such configuration, organic matter can be removed efficiently from both the anode and the cathode.

Further, the third step may be a step of purging an inside of the fuel cell.

As exhaust is performed via purging, the process can be performed in a shorter time than in the case of performing washing with water vapor generated through normal operation of the fuel cell.

Further, after the third step, a fourth step may be provided of creating produced water via power generation of the fuel cell and washing, with the produced water, the organic matter from the fuel cell.

Residual organic matter is evaporated or washed together with the produced water generated through operation and is then exhausted from the fuel cell. With such configuration, organic matter in the fuel cell can be further reduced.

Moreover, when a maximum output of the fuel cell after the removal step is below a standard value, the removal step may be repeated.

There may be a case in which a one-time performance of the removal step does not allow for the removal of organic matter adhering to the catalyst layers of the electrodes. According to the above method, when a maximum output of the fuel cell does not reach the standard value, the removal step is repeated again, and therefore, the removal of organic matter can be performed more reliably.

Further, when a maximum output of the fuel cell does not show an increase from a previous value after the removal step is performed twice or more, it may be determined that the fuel cell has a failure.

When a maximum output of the fuel cell does not show an increase from a previous value after the removal step is performed twice or more, this is highly likely to be due to a factor other than organic-matter-derived electrode contamination, and thus, recovery of the performance of the fuel cell cannot be expected even if the removal step is repeated thereafter. According to the above method, it is determined that the fuel cell in the above case has a failure, and this makes it possible to easily make a determination of a failure other than due to organic-matter-derived electrode contamination, whereby unnecessary repetition of the removal step can be avoided.

Effect of the Invention

The present invention can provide a method of manufacturing a fuel cell which enables organic matter of both an anode thereof and a cathode thereof to be removed efficiently.

BEST MODE FOR CARRYING OUT THE INVENTION

An embodiment of the present invention will hereinafter be described in detail. The positional relationships, such as up, down, left, and right, are based on those shown in the drawings unless otherwise noted. The ratios of dimensions in the drawings are not limited to those shown in the drawings. Further, the embodiment below is an example for describing the present invention, and the present invention is not intended to be limited to such embodiment. Various modifications may be made as long as they do not depart from the scope of the present invention.

(Configuration of Fuel Cell System)

Firstly, the entire configuration of a fuel cell system 10 according to this embodiment will be described.

Figure 1:
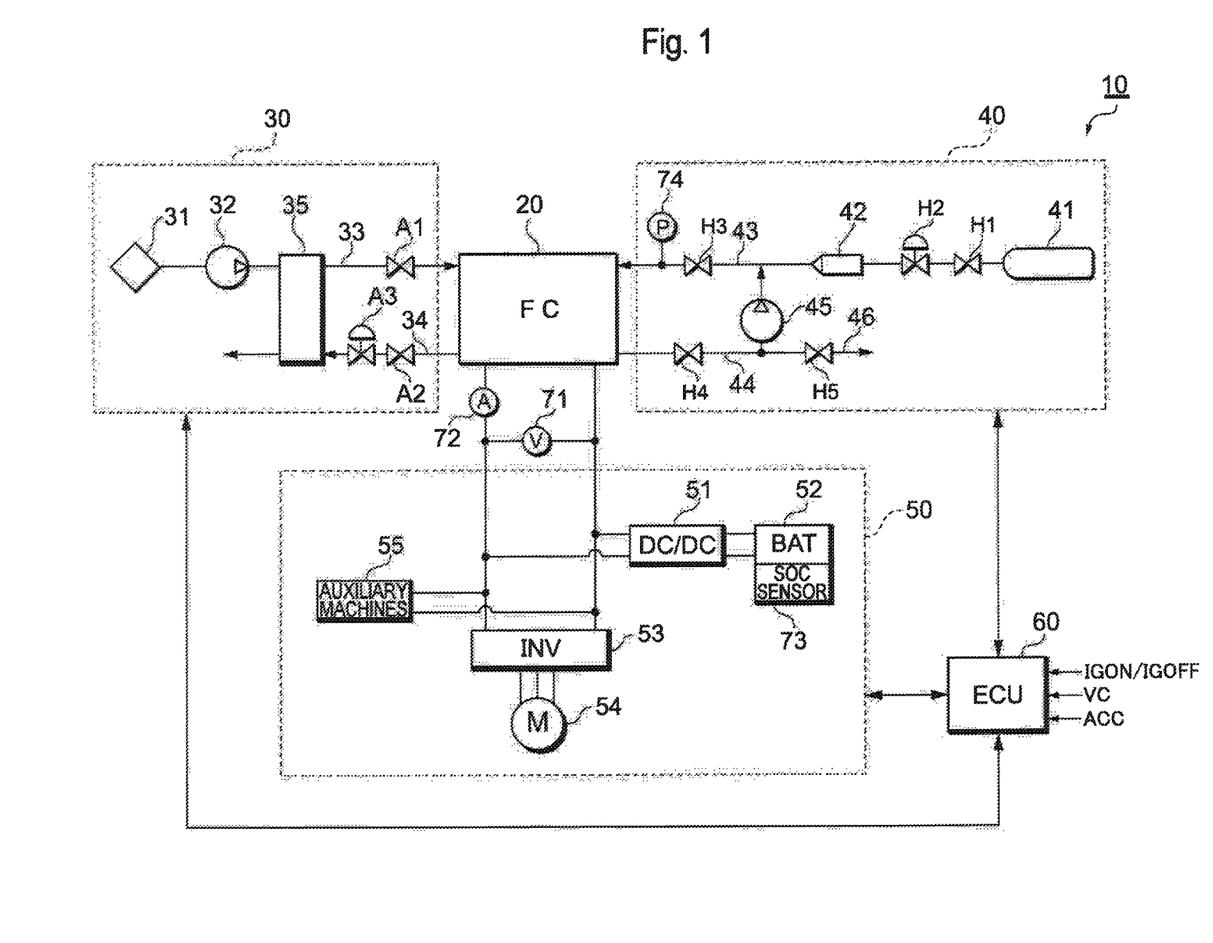
FIG. 1 is an explanatory diagram illustrating an outline of a fuel cell system.

The fuel cell system 10 functions as a vehicle-mounted power supply system to be mounted on, for example, a fuel cell vehicle as a mobile object, and is provided with: a fuel cell 20 that generates electric power upon the supply of reaction gases (fuel gas and oxide gas); an oxidant gas supply system 30 that supplies air as an oxidant gas to the fuel cell 20; a fuel gas supply system 40 that supplies a hydrogen gas as a fuel gas to the fuel cell 20; a power system 50 that controls charge/discharge of power; and a controller 60 that centrally controls the entire system.

The fuel cell 20 is a solid polymer electrolyte-type stack in which a large number of unit cells are stacked in series. In the fuel cell 20, the oxidization reaction of formula (1) below occurs at an anode, and the reduction reaction of formula (2) below occurs at a cathode. The electromotive reaction of formula (3) below occurs in the entire fuel cell 20.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

Figure 2:
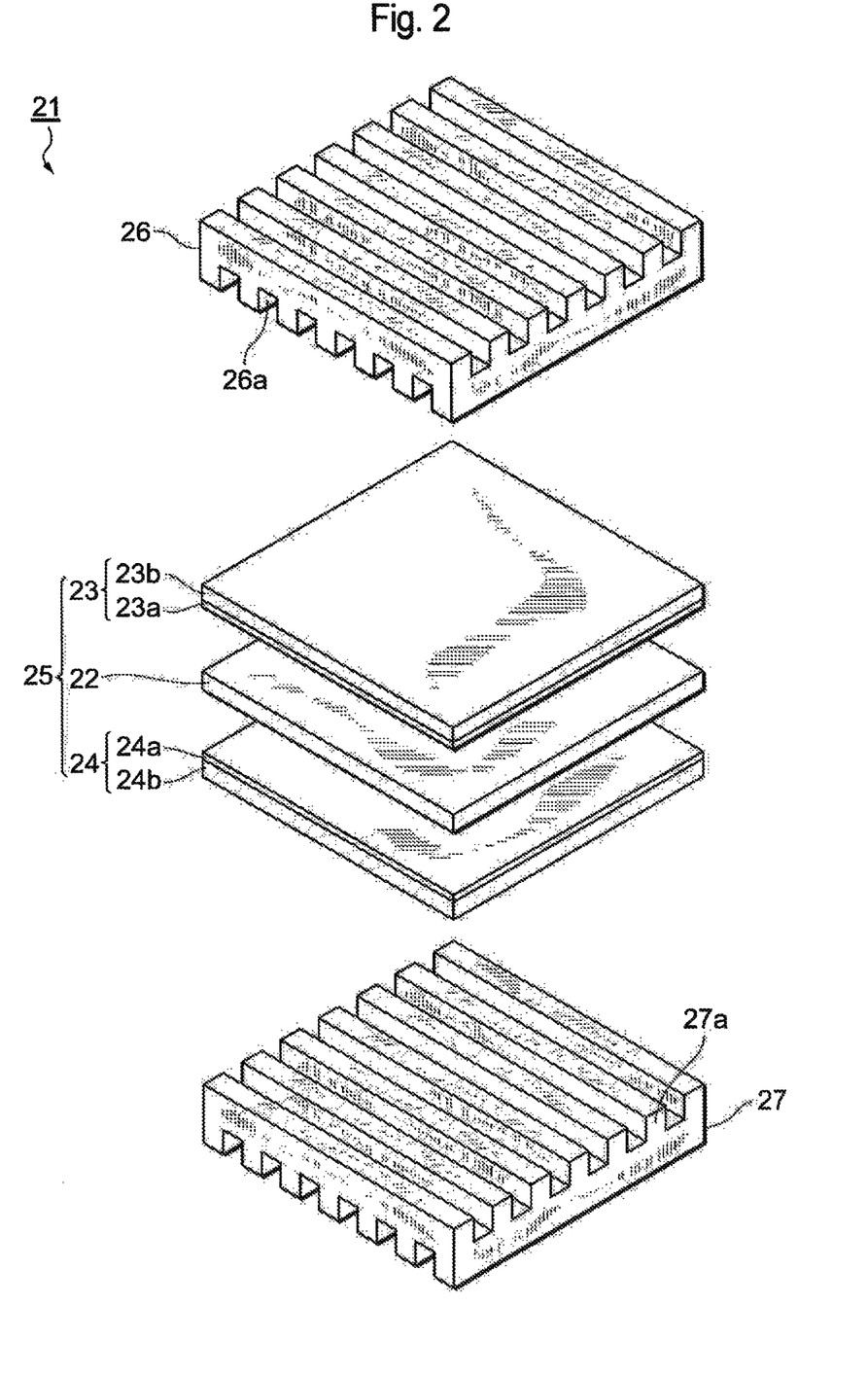
FIG. 2 is an explanatory diagram illustrating a structure of a unit cell of a fuel cell.

FIG. 2 is an exploded perspective view of a cell 21 that constitutes the fuel cell 20. The cell 21 is constituted by a polymer electrolyte membrane 22, an anode 23, a cathode 24 and separators 26 and 27. The anode 23 and the cathode 24 sandwich the polymer electrolyte membrane 22 therebetween so as to form a sandwich structure. The electrolyte membrane 22, the anode 23 and the cathode 24 constitute a membrane-electrode assembly (MEA) 25.

The polymer electrolyte membrane 22 is a proton conducting ion-exchange membrane formed of a polymer electrolyte material, such as fluororesin, and exerts satisfactory electric conductivity in its wet state.

Figure 3:
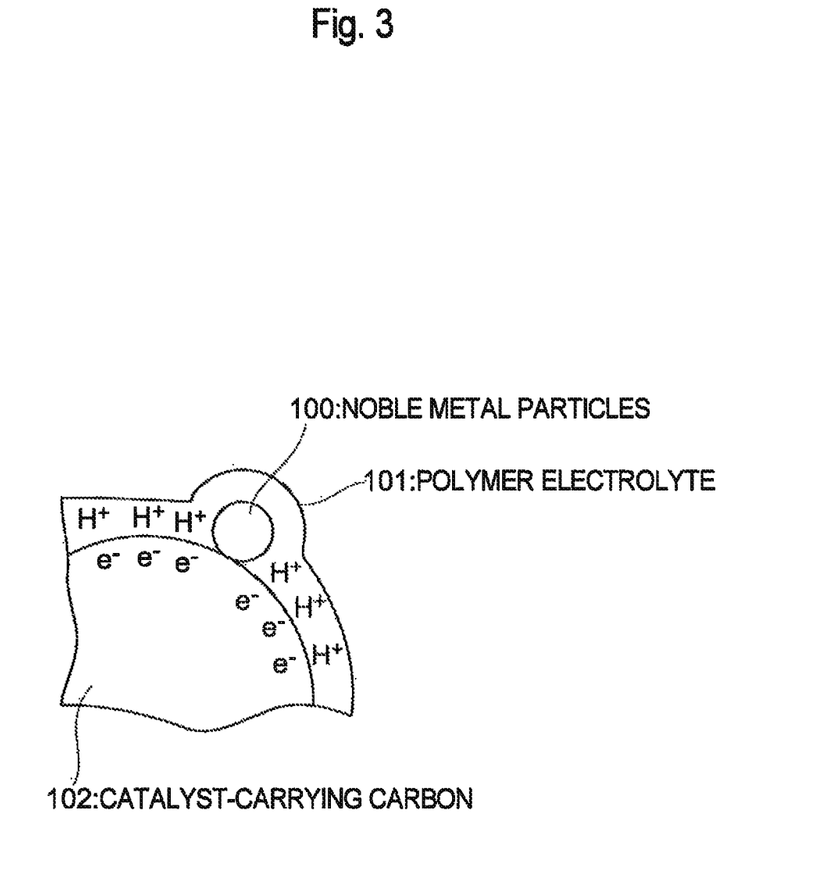
FIG. 3 is an explanatory diagram schematically illustrating polymer electrolyte and catalyst-carrying carbon in a catalyst layer.

The anode 23 has a catalyst layer 23a and a gas diffusion layer 23b. Similarly, the cathode 24 has a catalyst layer 24a and a gas diffusion layer 24b. As shown in FIG. 3, the catalyst layers 23a and 24a each comprise: catalyst-carrying carbon 102, which functions as a catalyst and which carries, for example, platinum-based noble metal particles 100; and polymer electrolyte 101.

Metal catalysts (for example, Pt, Pt—Fe, Pt—Cr, Pt—Ni and Pt—Ru) can be used as examples of platinum-based materials for the noble metal particles 100. Carbon black, etc., can be used as the catalyst-carrying carbon 102.

As the polymer electrolyte 101, a proton conducting ion-exchange membrane containing, for example, a perfluorocarbon sulfonic acid polymer, being fluororesin, or BPSH (sulfonated poly(arylene ether sulfone) copolymer), being non-fluororesin, can be used. Such perfluorocarbon sulfonic acid polymer and BPSH each comprise a sulfonic group. That is, each of such resins has iconicity and is also referred to as an "ionomer (ion+polymer)."

The catalyst layers 23a and 24a can each be formed by: adding a predetermined amount of the polymer electrolyte 101 to a predetermined amount of the catalyst-carrying carbon 102, which carries the noble metal particles 100 so as to obtain a resultant paste; and depositing such paste on the polymer electrolyte membrane 22 by means of screen printing. It should be noted that the catalyst layers 23a and 24a may be formed using another method, for example, spray coating.

The gas diffusion layers 23b and 24b are formed on the respective surfaces of the catalyst layers 23a and 24a and they each have both permeability and electronic conductivity. Further, the gas diffusion layers 23b and 24b are each made of carbon cloth, carbon paper or carbon felt formed of threads of carbon fiber.

The separators 26 and 27 are each formed of a gas impermeable conductive member, sandwich the anode 23 and the cathode 24 therebetween, and form flow paths for a fuel gas with respect to the anode 23 and flow paths for an oxidant gas with respect to the cathode 24.

The separator 26 is formed with ribs 26a each having a concave shape in cross section. The anode 23 is in contact with the ribs 26a, whereby an opening portion of each of the ribs 26a is closed, so that the fuel gas flow paths are formed. The separator 27 is provided with ribs 27a each having a concave shape in cross section. The cathode 24 is in contact with the ribs 27a, whereby an opening portion of each of the ribs 27a is closed, so that the oxidant gas flow paths are formed.

Returning to FIG. 1, the explanation will now be continued. As shown in FIG. 1, the fuel cell 20 is provided with a voltage sensor 71 for detecting an output voltage (FC voltage) of the fuel cell 20 and a current sensor 72 for detecting an output current (FC current).

The oxidant gas supply system 30 includes: an oxidant gas path 33, through which an oxidant gas to be supplied to the cathode 24 of the fuel cell 20 flows; and an oxidant off-gas path 34, through which an oxidant off-gas discharged from the fuel cell 20 flows. The oxidant gas path 33 is provided with: an air compressor 32 for taking in an oxidant gas from the atmosphere through a filter 31; a humidifier 35 for humidifying the oxidant gas pressurized by the air compressor 32; and a cutoff valve A1 for interrupting the supply of oxidant gas to the fuel cell 20.

The oxidant off-gas path 34 is provided with: a cutoff valve A2 for interrupting the discharge of the oxidant off-gas from the fuel cell 20; a backpressure regulating valve A3 for regulating the supply pressure of the oxidant gas; and the humidifier 35 for exchanging water between the oxidant gas (dry gas) and the oxidant off-gas (wet gas).

The fuel gas supply system 40 includes: a fuel gas supply source 41; a fuel gas path 43, through which a fuel gas to be supplied from the fuel gas supply source 41 to the anode 23 of the fuel cell 20 flows; a circulation path 44 for returning fuel off-gas discharged from the fuel cell 20 to the fuel gas path 43; a circulation pump 45 for pumping the fuel off-gas in the circulation path 44 to the fuel gas path 43; and an exhaust/drain path 46 which branches off from the circulation path 44.

The fuel gas supply source 41 is constituted by a high-pressure hydrogen tank, hydrogen absorbing alloys, etc., and stores hydrogen gas at high pressure (for example, 35 MPa to 70 MPa). When a cutoff valve H1 is opened, the fuel gas flows from the fuel gas supply source 41 to the fuel gas path 43. The pressure of the fuel gas is reduced to approximately, for example, 200 kPa, by a regulator H2 and an injector 42, and the gas is supplied to the fuel cell 20.

Connected to the circulation path 44 is a cutoff valve H4 for interrupting the discharge of fuel off-gas from the fuel cell 20 and the exhaust/drain path 46 that branches off from the circulation path 44. The exhaust/drain path 46 is provided with an exhaust/drain valve H5. The exhaust/drain valve H5 operates in accordance with commands from the controller 60, thereby discharging (purging) the fuel off-gas containing impurities and water in the circulation path 44 to the outside.

The fuel off-gas discharged through the exhaust/drain valve H5 is mixed with the oxidant off-gas flowing in the oxidant off-gas path 34, and the mixture is diluted with a diluter (not shown). The circulation pump 45 circulates and supplies the fuel off-gas in the circulation system to the fuel cell 20 via a motor drive.

The power system 50 is provided with a DC/DC converter 51, a battery (power storage device) 52, a traction inverter 53, a traction motor 54 and auxiliary apparatuses 55. The DC/DC converter 51 has a function of increasing a direct-current voltage supplied from the battery 52 and outputting the resultant direct-current voltage to the traction inverter 53, and has a function of decreasing the voltage of direct-current power generated by the fuel cell 20 or the voltage of the regenerative power collected by the traction motor 54 via regenerative braking and discharging the battery 52 with the resultant power.

The battery 52 functions as a storage source of surplus power, a storage source of regenerative energy during regenerative braking, and an energy buffer during a load variation as a result of acceleration or deceleration of a fuel cell vehicle. The battery 52 is preferably constituted by a secondary battery such as a nickel/cadmium battery, a nickel/hydrogen battery, or a lithium secondary battery. The battery 52 is provided with an SOC sensor 73 for detecting the SOC (state of charge) as the amount of power remaining in the battery 52.

The traction inverter 53 is, for example, a PWM inverter driven by a pulse width modulation method. In accordance with control commands from the controller 60, the traction inverter 53 converts a direct-current voltage output from the fuel cell 20 or the battery 52 into a three-phase AC voltage, thereby controlling a rotation torque of the traction motor 54. The traction motor 54 is, for example, a three-phase AC motor, and constitutes a power source of the fuel cell vehicle.

The auxiliary apparatuses 55 refer to a generic name for motors arranged in the respective units in the fuel cell system 10 (for example, power sources for pumps, etc.), inverters for driving these motors, and various vehicle-mounted auxiliary apparatuses (for example, an air compressor, an injector, a cooling water circulation pump and a radiator).

The controller 60 is a computer system which comprises a CPU, a ROM, a RAM and an input/output interface, and controls the respective units of the fuel cell system 10. For example, when receiving an ignition signal IG output from an ignition switch, the controller 60 starts the operation of the fuel cell system 10, and obtains the power required from the entire system based on an acceleration-opening-degree signal ACC output from an acceleration sensor, a vehicle speed signal VC output from a vehicle speed sensor, etc. The power required from the entire system corresponds to the total value of the vehicle driving power and the auxiliary-apparatus power.

The auxiliary-apparatus power includes, for example, power consumed by vehicle-mounted auxiliary apparatuses (for example, a humidifier, an air compressor, a hydrogen pump and a cooling water circulation pump), power consumed by devices necessary for vehicle driving (for example, a transmission, a wheel control device, a steering device and a suspension device), and power consumed by devices arranged in an occupant space (for example, an air-conditioning device, lighting equipment and an audio equipment system).

The controller 60 determines an output power distribution between the fuel cell 20 and the battery 52, and controls the oxidant gas supply system 30 and the fuel gas supply system 40 so that the amount of power generated by the fuel cell 20 matches a target power. Further, the controller 60 controls the DC/DC converter 51 so as to adjust the output voltage of the fuel cell 20, thereby controlling the operation point (output voltage and output current) of the fuel cell 20.

(Step of Inspecting Fuel Cell)

During the operation of the fuel cell system 10, in the fuel cell 20, as shown in formula (1) above, the hydrogen ions produced at the anode 23 permeate through the polymer electrolyte membrane 22 and move to the cathode 24, and, as shown in formula (2) above, the hydrogen ions that have moved to the cathode 24 electrochemically react with oxygen in the oxidant gas that has been supplied to the cathode 24, thereby causing a reduction reaction of oxygen to occur, which results in the production of water.

Here, organic matter may adhere to the anode 23 and the cathode 24 of the membrane electrode assembly (MEA) during the manufacture of the fuel cell 20, leading to catalyst poisoning. For example, the present inventors, etc., have achieved the following finding in that: butanol (for example, t-butanol contained in the rubber comprised in the components of the fuel cell 20, and butanol/butanone/butanol contained in the air inside a plant, etc.) reacts with the platinum contained in the catalyst layers 23a and 24a of the anode 23 and the cathode 24, leading to the production of isobutyric acid; and such produced isobutyric acid is adsorbed to the noble metal particles 100 between the catalyst-carrying carbon 102 and the polymer electrolyte 101. In such case, the activity of the catalyst decreases, and thus, the fuel cell 20 cannot exert a desired output (hereinafter, organic matter, such as isobutyric acid, being adsorbed to the noble metal particles 100 serving as a catalyst is also referred to as "organic contamination").

In view of the above, in this embodiment, the step of removing (removal step) organic contamination from the fuel cell 20 is performed during a pre-shipment inspection after the assembly (preparation step) of the fuel cell 20. Such removal step will hereinafter be described in detail, using FIGS. 4 to 6.

Figure 4:
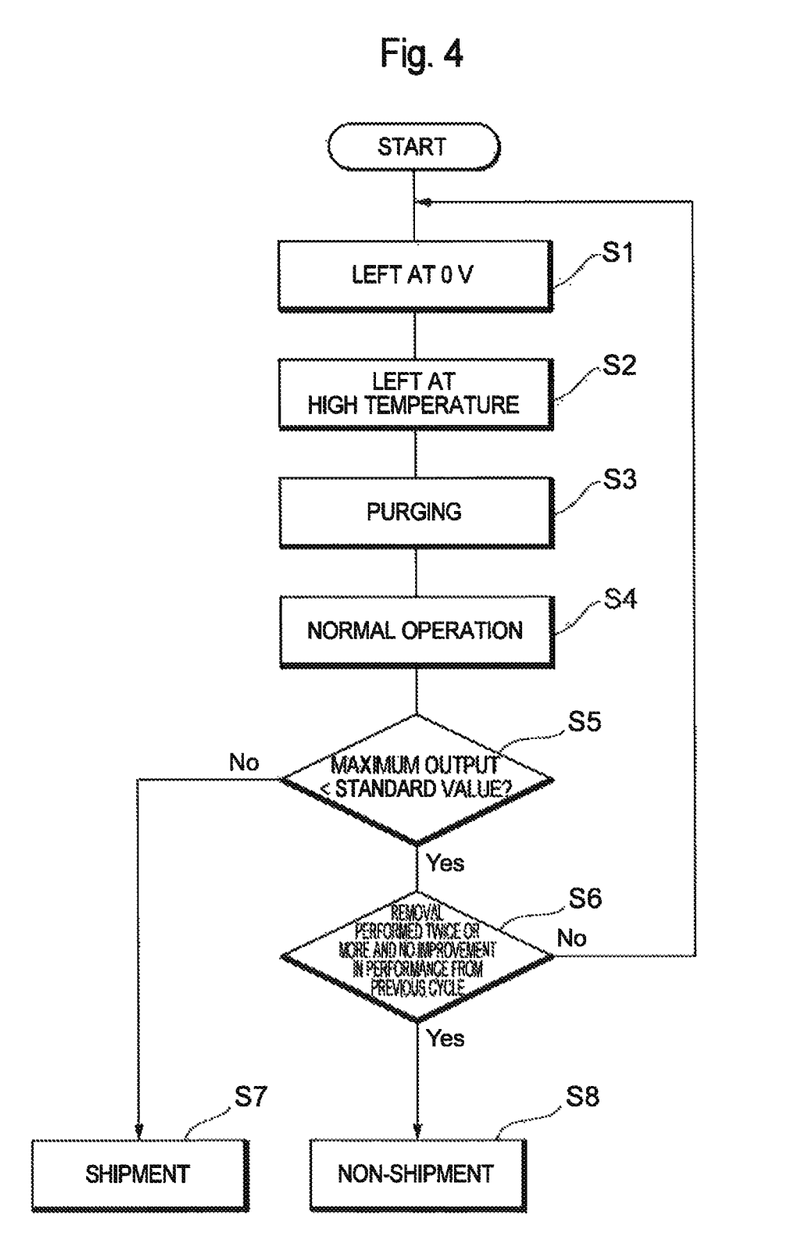
FIG. 4 is a flowchart for explaining an organic-matter removal step.

Firstly, in a state in which hydrogen is sealed on the anode 23 side while nitrogen or hydrogen is sealed on the cathode 24 side in the fuel cell 20, the fuel cell 20 is maintained at a voltage of 0 V for a given time (at least 10 minutes or more) in an environment at a temperature of 40° C. or higher (step S1: first step). Thus, the organic matter (isobutyric acid) that has adsorbed to the catalyst is desorbed.

Next, temperature-controlled coding water is supplied to a coding flow path in the fuel cell 20 while the anode and the cathode are in a sealed state, thereby raising the temperature of the fuel cell 20 (to at least 80° C. or higher) (step S2: second step). Thus, the desorbed organic matter (isobutyric acid) is evaporated.

Subsequently, hydrogen and nitrogen are respectively supplied to the anode 23 side and the cathode 24 side in the fuel cell 20 so as to purge the inside of the fuel cell 20 (step S3: third step). Thus, the evaporated organic matter (isobutyric acid) is exhausted from the fuel cell 20. Further, as such exhaust is performed via purging, the process can be performed in a shorter time than in the process of step S4 described below.

The fuel cell 20 is then caused to undergo normal operation (step S4: fourth step). That is, a fuel gas is supplied to the anode 23 while an oxidant gas is supplied to the cathode 24 so that power is generated. Thus, residual organic matter (isobutyric acid) is evaporated or washed with water vapor (produced water) generated through operation and is then exhausted from the fuel cell 20. This allows for a further reduction in the organic matter in the fuel cell. In addition, during power generation, a maximum output (power) of the fuel cell 20 is measured. Combining steps S3 and S4 enables the process to be performed in a shorter time than in the process of repeating step S4.

Next, a determination is made as to whether or not the maximum output has reached a predetermined standard value (step S5). If the maximum output is below the standard value (step S5: Yes), the process proceeds to step S6 in order to determine whether the removal of organic matter is to be repeated. If the maximum output is the standard value or more (step S5: No), it is determined that the fuel cell 20 is ready for shipment (step S7).

Figure 5:
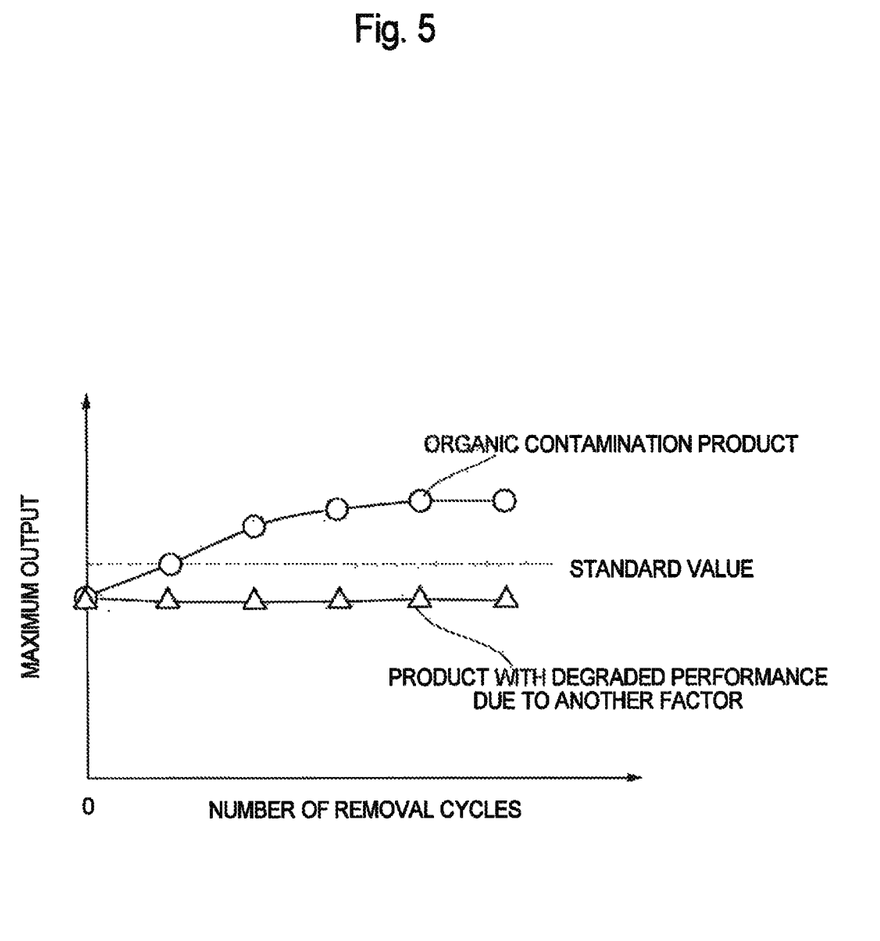
FIG. 5 is a graph for explaining the relationship between the number of removal cycles and a maximum output.

A determination is made in step S6 as to whether the removal of organic matter needs to be repeated. Here, a determination is made based on the below finding by the present inventors, etc. That is, as shown in FIG. 5, when the maximum output of the fuel cell 20 has not reached the standard value due to organic contamination (organic-contaminated product), the performance is gradually recovered so that the maximum output exceeds the standard value by repeating the above-described removal cycle at least twice. Meanwhile, when the maximum output has not reached the standard value due to a factor other than organic contamination (product with degraded performance due to another factor), the performance will not be recovered, even by repeating the cycle of removing organic matter.

Based on the above finding, in step S6, if the removal of organic matter has been performed twice or more and also if the maximum output does not show an increase from that of the previous cycle (no improvement in the performance) (step S6: Yes), this may highly likely be due to a factor other than organic-matter-derived electrode contamination, and thus, the recovery of performance cannot be expected, even if the removal step is repeated, thereby resulting in a determination that the fuel cell 20 should not be shipped (step S8). This makes it possible to easily make a determination of there being a failure other than organic-matter-derived electrode contamination, whereby unnecessary repetition of the removal step can be avoided. Meanwhile, if the removal of organic matter has been performed only once, or if, although the removal of organic matter has been performed twice or more, the maximum output shows an increase from that of the previous cycle (step S6: No), the process returns to step S1 in order to re-perform the removal of organic matter. The removal step is performed repeatedly only if organic contamination is expected, and therefore, the removal of organic matter can be performed efficiently and reliably.

Through the above-described step of removing organic contamination, organic matter can be removed efficiently from both an anode and a cathode. That is, it generally takes, for example, 30 days or longer to completely remove the organic matter adsorbed to electrodes via decomposition or volatilization. Meanwhile, according to the above method, such duration can be shortened to several hours by repeating desorption, forced volatilization and optionally washing via power generation.

Figure 6:
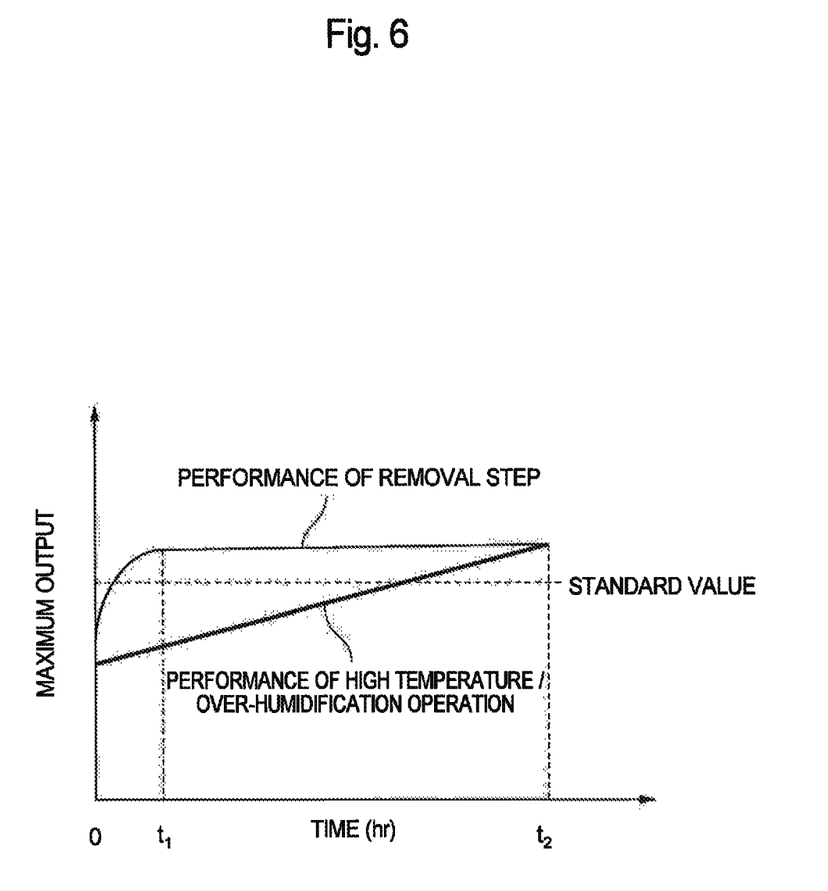
FIG. 6 is a graph for explaining the relationship between the time for removal of organic matter and a maximum output.

It should be noted that the removal of organic contamination can also be achieved by repeatedly performing a high temperature/over-humidification operation, which comprises humidifying a fuel gas and an oxidant gas and then supplying the resultant gases to the fuel cell 20, and performing operation at high temperature. However, as shown in FIG. 6, high temperature/over-humidification operation merely involves the repetition of washing/evaporation of organic matter with water vapor produced via power generation, resulting in a long time ($t_2$) for a maximum output to reach a standard value. Meanwhile, in the step of removing organic contamination in the present embodiment, the desorption, evaporation and discharge via purging of organic matter are performed, and this makes it possible to remarkably shorten the time ($t_1$) for a maximum output to reach a standard value.

DESCRIPTION OF SYMBOLS

10: fuel cell system
20: fuel cell
21: cell
22: polymer electrolyte membrane
23: anode electrode
23a: catalyst layer
23b: gas diffusion layer
24: cathode electrode
24a: catalyst layer
24b: gas diffusion layer
26: separator
26a: rib
27: separator
27a: rib
30: oxidant gas supply system
31: filter
32: air compressor
33: oxidant gas path
34: oxidant off-gas path
35: humidifier
40: fuel gas supply system
41: fuel gas supply source
42: injector
43: fuel gas path
44: circulation path
45: circulation pump
46: exhaust/drain path
50: power system
51: DC/DC converter
52: battery
53: traction inverter
54: traction motor
55: auxiliary apparatuses
60: controller 71: voltage sensor
72: current sensor
73: sensor
100: noble metal particles
101: polymer electrolyte
102: catalyst-carrying carbon

What is claimed is:

1. A method of manufacturing a fuel cell, comprising:
a preparation step of preparing a fuel cell comprising a stack of a plurality of unit cells each including polymer electrolyte and a catalyst layer; and
a removal step of removing organic matter from the fuel cell,
wherein the removal step comprises:
a first step of maintaining a voltage of the fuel cell at 0 V in a state in which hydrogen is sealed on an anode side while nitrogen or hydrogen is sealed on a cathode side in the fuel cell so as to desorb organic matter from the catalyst layer;
a second step of raising a temperature inside the fuel cell while the anode and the cathode are in the sealed state so as to evaporate the desorbed organic matter; and
a third step of exhausting the evaporated organic matter from the fuel cell.

2. The method of manufacturing a fuel cell according to claim 1, wherein the third step is a step of purging an inside of the fuel cell.

3. The method of manufacturing a fuel cell according to claim 1, comprising, after the third step, a fourth step of creating produced water via power generation of the fuel cell and washing, with the produced water, the organic matter from the fuel cell,
wherein the first step of maintaining at a voltage of 0 V in a state in which hydrogen is sealed on the anode side while nitrogen or hydrogen is sealed on the cathode side is performed for at least 10 minutes or more at a temperature of 40° C. or higher.

4. The method of manufacturing a fuel cell according to claim 1, wherein, when a maximum output of the fuel cell is below a standard value, the removal step is repeated.

5. The method of manufacturing a fuel cell according to claim 4, wherein, when a maximum output of the fuel cell does not show an increase from a previous value after the removal step is performed twice or more, it is determined that the fuel cell has a failure.

* * * * *